June 29, 1954   A. W. BOWMAN   2,682,256
HYDRAULIC SERVOMOTOR WITH AN INTEGRAL SOLENOID VALVE
Filed Aug. 31, 1950
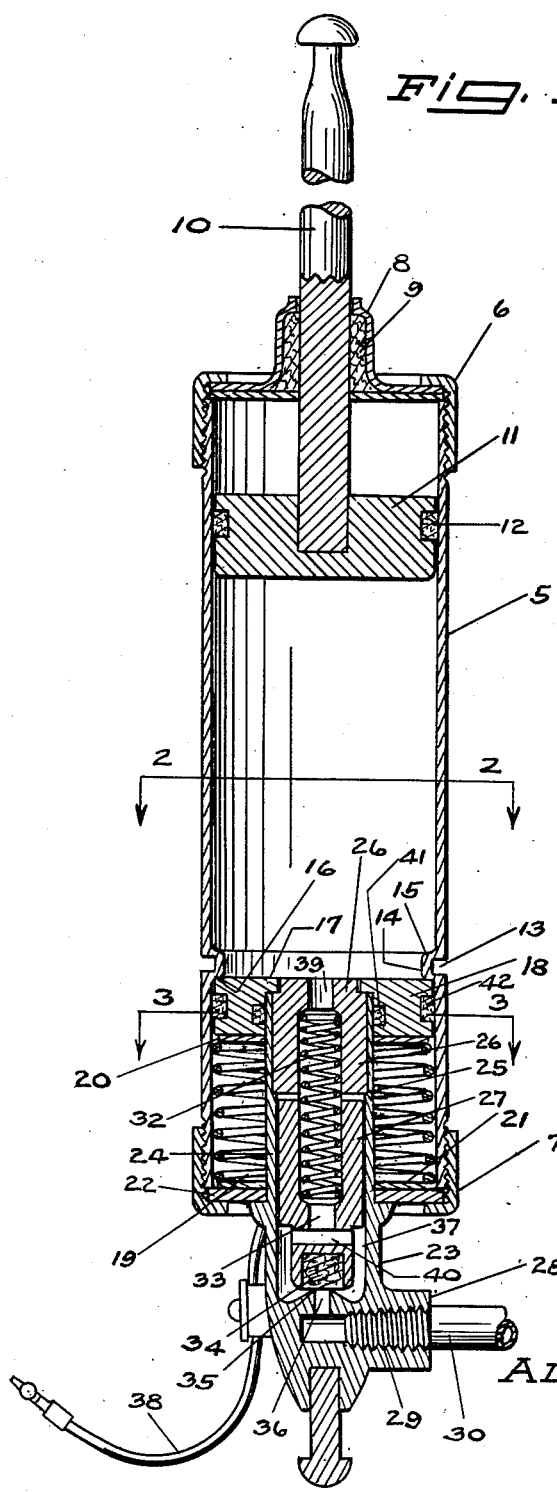
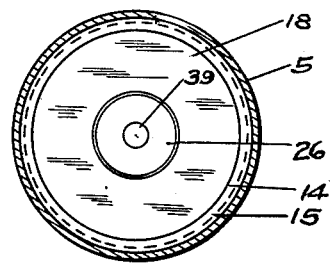
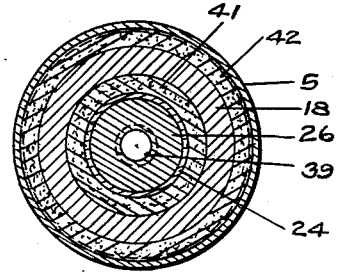
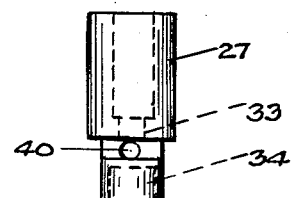
INVENTOR.
ALFRED W. BOWMAN
BY Edward C. Healy
ATTORNEY Patented June 29, 1954

2,682,256

UNITED STATES PATENT OFFICE 2,682,256

HYDRAULIC SERVOMOTOR WITH AN INTEGRAL SOLENOID VALVE

Alfred W. Bowman, Novato, Calif.

Application August 31, 1950, Serial No. 182,603

1 Claim. (Cl. 121—44)

This invention relates to improvements in automobile window hydraulic regulating devices and particularly relates to improvements in the construction of the hydraulic cylinder and the operating mechanism provided therein.

The invention more especially relates to improvements in that type of automobile window regulator as set forth in my co-pending application Serial No. 66,223, filed December 20, 1948, for Hydraulic Window Regulators, now abandoned.

An object of the present invention is the provision of a hydraulic cylinder and to provide a new solenoid stop therein commonly called the anvil, by pressing a circumferential groove in the outer periphery of the cylinder, whereby a circumferential static retainer shoulder is formed on the inner periphery of the cylinder, the upper surface of the said shoulder providing a positive stop for limiting the downward movement of the piston and the lower surface thereof providing a stop for limiting the uppermost position of a packing ring retainer provided over the solenoid.

Another object of the present invention is the provision of a ring retainer which serves as a static retainer for the inside and outside ring seals, enabling a magnetic path to be produced from the casing to the anvil, thereby increasing magnetic pull of a solenoid by being in direct contact with casing at the casing groove, thus eliminating any magnetic gap between the retainer and casing at the casing groove. The said construction retains the hydraulic pressure within the cylinder off of the solenoid winding and eliminates electrolysis between the solenoid body and casing, thereby preventing disintegration at end of the solenoid body.

A further object of the present invention is the provision of an improved automobile hydraulic window lifting and seat adjusting device that is durable, simple in construction, economical to manufacture, positive in operation and highly efficient and serviceable in use.

Other objects and advantages will be apparent during the course of the following description:

In the accompanying drawing forming a part of the description wherein for the purpose of illustration like numerals designate like parts throughout the same, Fig. 1 is a vertical central longitudinal sectional view of a hydraulic casing and piston employed in the invention and the valve and solenoid assemblies associated therewith, Fig. 2 is a horizontal sectional view taken on line 2—2 of Fig. 1, looking in direction of the arrows, and Fig. 3 is a horizontal sectional view taken on line 3—3 of Fig. 1, looking in direction of the arrows, Fig. 4 is a side elevational view of a vertical lower inner resiliently retained bushing carrying a bottom packing for sealing the inlet.

Referring in detail to the drawing and numerals thereof, 5 designates the cylinder as a whole and numerals 6 and 7 the upper and lower caps threadedly secured thereto. The upper cap 6 retains a packing box 8 carrying a suitable packing 9 as disclosed to advantage in Fig. 1. A suitable vertical shaft 10 is slidably mounted through the upper cap and the packing 9 thereof and extends to and within the cylinder 5 and is fixed into a conventional piston 11 provided with a packing ring 12. A groove 13 is pressed in the outer periphery of the cylinder and forms an internally protruding ring 14 within the cylinder and a shoulder 15 capable of providing a "stop" for the piston 11. The lower face 16 of the ring 14 provides a stop for the packing retaining ring 18 mounted above the solenoid coil 19. Suitable insulation washers 20 and 21 are positioned above and below the solenoid coil 19. The said washer or apertured plate 22 is fixed to the base member 23 which base member is preferably made of non-ferrous metal and is retained against the lower extremity of the cylinder 5 by the threaded cap 7.

The sleeve 24 extending from the base member 23, is formed with a shoulder 25 upon which an upper inner bushing or anvil 26 rests. This element is commonly known as a solenoid anvil. A lower inner bushing or solenoid plunger 27 is slidably mounted within the sleeve portion 24 of the base member 23, the said sleeve 24 being fixed to the apertured plate 22 by being pressed therein or in any other suitable manner. The base member 23 is formed with a threaded opening 29 for receiving the pressure inlet line 30. It will be noted that a vertical inlet opening 36 enables communication to be maintained between the said inlet line and the area within the cylinder. A suitable coil spring 32, preferably made of spring steel is positioned within the bushings 26 and 27 and between the openings 33 and 39 and is compressed between the upper fixed bushing 26 and the lower slidable bushing 27. Thus, the packing 34, provided in the lower bushing 27, is resiliently retained against a seat 35 that surrounds the vertical inlet opening 36. It will be observed that the lower portion of the bushing 27 is reduced in diameter. It thus provides in the base member 23 a passageway 37 from the base inlets 29 and 36 through the bushings 27 and 26 via passageways 40, 33 and 39, to and within the cylinder 5. The numeral 38 designates a conventional insulated electrical connecting wire leading to one potential of a source of electrical energy. The other source is made by means of grounding to 22 or 23.

From the foregoing description taken in consideration with the accompanying drawing it will be noted that the entire assembly, within the cylinder, can be readily dismantled and reassembled, greatly facilitating repairs and the replacing of parts.

The static ring retainer 18 acts as a static retainer for the inside and outside ring seals 41 and 42, respectively, and also acts as a magnetic path from the casing to the anvil. The said retainer increases magnetic pull of the solenoid by being in direct contact with the casing at the casing groove. The retainer keeps the hydraulic pressure off of the electrical winding, which is a very important point, electrically. It holds the solenoid anvil in place instead of using a pin as previously employed. The new static retainer eliminates electrolysis between the solenoid body and the casing, thereby preventing disintegration of the end of the solenoid body.

The new anvil and retainer combined facilitates assembly. No special assembly fixture is required. Chamfering at both ends of the casing eliminates chafing of the seal rings, when assembling.

The new casing groove positions and holds the solenoid assembly without the use of a pin as previously employed. The casing groove also acts as a positive stop for the piston. As an alternate arrangement, however, the solenoid anvil could protrude up through the retainer and above the new casing groove and also act as a stop for the piston. The piston could also have a relief clearance for the casing groove and would come to rest directly against the new retainer and solenoid anvil.

The arrangement of three proper dissimilar metals are chosen from the electro-chemical series for one, a solenoid spring; two, a solenoid plunger together with the solenoid stop as a unit; and, three, a solenoid body. This arrangement eliminates electrolysis between the spring and the solenoid plunger together with the solenoid anvil thereby preventing disintegration of the spring as frequently occurs.

Electrolysis elimination is a very important item, for with electrolysis present the very best cylinder mechanically constructed will shortly fail. Electrolysis, heretofore, has destroyed the end of the solenoid body.

It is a well known fact in electro-chemistry that two dissimilar metals, when placed in an electrolyte, causes a potential difference with a resultant current to flow when the metals are brought in contact with one another, which in turn causes disintegration of one of the metals. By the arrangement of three dissimilar metals properly chosen from the electro-chemical series one potential can be made to directly oppose the other, thereby eliminating electrolysis and resultant disintegration of one or all the metals. The electrolyte in this instance consists of a hydraulic brake fluid, which fluid is usually composed of castor oil and methyl alcohol. There are other hydraulic fluids, mineral in nature, that become effective electrolytes with age. The provision of three proper dissimilar metals has been provided as indicated by the spring 32, formed in this instance of carbon steel; the said coil spring being mounted within the hollow solenoid anvil 26 and the hollow solenoid plunger 27, both of which in this instance are formed of mild steel. This assembly, consisting of the said spring 32, anvil 26 and plunger 27, is in turn mounted within a specially constructed sleeve 24, as disclosed in Fig. 1. In this instance the said sleeve is formed of a cast zinc alloy. Due to this arrangement, the potential, produced by the dissimilar parts 26 and 27 together with the sleeve 24, is in direct opposition to that produced between the anvil 26 and plunger 27, acting with the spring 32. As the result of this negation, no current flows between the spring 32 and the anvil 26 and plunger 27. Thus there is eliminated disintegration of the spring 32. By the same principle disintegration is eliminated on the upper extremity of the sleeve 24 by the superimposing of the sealing ring retainer 18 over said sleeve.

In the operation of the hydraulic window service, hydraulic fluid under pressure enters through the inlet line 30. It passes through passageways 29, 36, 37, 40, 33 and 39 to a position within the casing or cylinder 5 and against the base of the piston 11. When this operation occurs the shaft 10 will be raised due to the pressure of the fluid on the piston. It will be obvious that fluid will only pass as described when the solenoid coil 19 is energized and the solenoid plunger 27 is brought into contact with the solenoid anvil 26 and away from its seat 35.

The piston is lowered into the cylinder by the electrical opening of the solenoid valve and an extraneous spring pressure exerted against the shaft 10.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

In combination with a hydraulic pressure operated device for lifting a window and embodying in its construction an elongated vertical cylinder, equipped with an inner circumferential groove, a piston including an outwardly extending vertical shaft mounted therein, a valve unit fixed in the lower portion of the cylinder for controlling the pressure applied against the piston, said unit embodying in its construction a sealing ring of magnetic material slidably mounted within the cylinder and spaced below the piston, and including a solenoid sleeve, a solenoid winding thereon, a movable valve member therein and a fixed bushing therein, said sealing ring bearing against the lower shoulder of the inner circumferential groove, said sealing ring carrying in its inner and outer peripheries two resilient seals providing a fluid seal between the solenoid sleeve and the sealing ring and a fluid seal between the sealing ring and the cylinder thereby sealing off the solenoid winding from the whole fluid compartment formed by the piston, cylinder and solenoid valve assembly, said sealing ring surrounding and positioning the fixed bushing in the upper portion of the solenoid sleeve, and thus providing a magnetic path for the induced magnetism from the cylinder wall and adjacent solenoid winding and concentrating the magnetic flux, so induced, in the upper fixed bushing of the solenoid valve, and capable of increasing the flux density in the upper fixed bushing without increasing the ampere turns of the solenoid winding, whereby there is provided an electrical path for the opposing electrical potentials created by electrolysis within the fluid chamber of the valve assembly proper, to thus cancel out any effective electrolysis and resultant physical metallic deterioration of the solenoid valve assembly, and capable of eliminating electrolysis and resultant physical metallic deterioration between the solenoid sleeve and the cylinder proper.

References Cited in the file of this patent

UNITED STATES PATENTS

| Number | Name | Date |
|---|---|---|
| 2,299,695 | Greene | Oct. 20, 1942 |
| 2,311,864 | Parsons | Feb. 23, 1943 |
| 2,468,943 | Parsons | May 3, 1949 |
| 2,479,398 | Parsons | Aug. 16, 1949 |
| 2,586,683 | McLeod | Feb. 19, 1952 |

FOREIGN PATENTS

| Number | Country | Date |
|---|---|---|
| 570,546 | Great Britain | July 11, 1945 |